United States Patent

Kiuchi et al.

Patent Number: 5,616,631
Date of Patent: Apr. 1, 1997

[54] BINDER COMPOSITION FOR MOLD MAKING, BINDER/CURING AGENT COMPOSITION FOR MOLD MAKING, SAND COMPOSITION FOR MOLD MAKING, AND PROCESS OF MAKING MOLD

[75] Inventors: Kazuhiko Kiuchi, Aichi; Shigeo Nakai; Masuo Sawa; Masayuki Kato, all of Aichi; Mitsuru Sakai, Wakayama; Shinya Nomura, Aichi, all of Japan

[73] Assignee: Kao Corporation, Tokyo, Japan

[21] Appl. No.: 550,734

[22] Filed: Oct. 31, 1995

Related U.S. Application Data

[62] Division of Ser. No. 291,065, Aug. 17, 1994, Pat. No. 5,491,180.

[51] Int. Cl.$^6$ .............................. B22C 1/22; C08F 283/00
[52] U.S. Cl. .......................... 523/139; 525/480; 525/485; 525/534; 523/144; 523/145
[58] Field of Search ................................. 525/480, 485, 525/534; 523/139, 144, 145

[56] References Cited

U.S. PATENT DOCUMENTS

| 4,634,723 | 1/1987 | Gardziella et al. | 523/144 |
| 5,491,180 | 2/1996 | Kiuchi et al. | 523/139 |

*Primary Examiner*—Samuel A. Acquah
*Attorney, Agent, or Firm*—Oblon, Spivak, McClelland, Maier & Neustadt, P.C.

[57] ABSTRACT

Sand compositions containing a binder composition and a curing agent, in which the binder composition comprises (a) a binder comprising an acid-curable resin and (b) from 0.5 to 63.0% by weight, based on the binder composition, of at least one curing accelerator selected from compounds represented by formula (1):

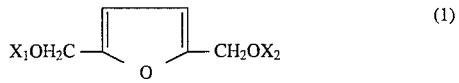

wherein $X_1$, $X_2$ each represent a hydrogen atom, a methyl group or an ethyl group;
exhibit an increased curing rate to provide a casting mold having an increased initial strength.

24 Claims, No Drawings

BINDER COMPOSITION FOR MOLD MAKING, BINDER/CURING AGENT COMPOSITION FOR MOLD MAKING, SAND COMPOSITION FOR MOLD MAKING, AND PROCESS OF MAKING MOLD

This is a Division of application Ser. No. 08/291,065 filed on Aug. 17, 1994 now U.S. Pat. No. 5,491,180.

BACKGROUND OF THE INVENTION

1. Field of the Invention

The present invention relates to a binder composition for mold making which is useful in making a casting mold, especially a self-hardening mold, a composition for casting mold making comprising the binder composition and a specific curing agent composition, a sand composition for mold making containing the binder composition or binder/curing agent composition, and a process for making a mold using the sand composition.

2. Discussion of the Background

Self-hardening molds have conventionally been produced by mixing a granular refractory material, such as silica sand, with a binder comprising an acid-curable resin and a curing agent, charging the mixture in a pattern, and causing the binder to cure.

In an early stage of the art, a thick solution of phosphoric acid had been widely used as a curing agent for the acid-curable resin. For example, JP-B-39-1543 (the term "JP-B" as used herein means an "examined Japanese patent publication") discloses the use of an acid-curable resin, such as an acid-curable furan resin, as a binder and use of an aqueous solution of an acid, e.g., phosphoric acid, as a curing agent for the binder. JP-A-47-16324 (the term "JP-A" as used herein means an "unexamined published Japanese patent application") discloses the use of phosphorous pentoxide ($P_2O_5$) as a curing agent.

However, since the conventional binders generally have a low curing rate, the strength of the mold obtained in the initial stage (initial strength) is low. That is, a long time is required from the filling of the pattern to the removal of the cured mold from the pattern, resulting in poor utilization of the pattern.

In order to overcome this disadvantage, an increase in the amount of curing agent has been attempted. However, if mold making is repeated while using a large quantity of phosphoric acid as a curing agent, phosphorus is gradually accumulated in the reclaimed sand to a large quantity, which often causes casting defects, such as pinholes. Further, since the reclaimed sand absorbs moisture due to the accumulated phosphorus, it tends to provide a casting mold having a deteriorated strength.

For these reasons, an aromatic sulfonic acid, such as benzenesulfonic acid, toluenesulfonic acid or xylenesulfonic acid, which has high reactivity to increase the curing rate of an acid-curable resin has been used as a curing agent in place of phosphoric acid. However, aromatic sulfonic acids decompose due to the heat of a casting material, whereby it releases poisonous decomposition products, such as sulfur-containing gas. Therefore, the use of an aromatic sulfonic acid as a curing agent is detrimental to the working environment.

Hence, alteration of the kind of a binder itself has been attempted instead of increasing the amount of a curing agent or changing of the curing agent. For example, JP-A-56-56753 proposes to incorporate, into furfuryl alcohol, a resol type phenol-formaldehyde resin substantially free from a mononuclear phenolic compound, a binuclear phenolic compound or a methytol derivative thereof. The use of such a resol type phenol-formaldehyde resin substantially free from low-molecular weight resins as part of a binder brings about reduction in time required for high-molecular forming reaction, thereby improving mold strength in the initial stage.

However, there remains a need for binder compositions for mold making which provide a mold with high initial strength and do not suffer from the above-described drawbacks.

SUMMARY OF THE INVENTION

Accordingly, one object of the present invention is to provide novel binder compositions for mold making, which comprise a conventional binder and provides a mold with a high initial strength.

It is another object of the present invention to provide binder compositions for mold making which minimize the release of toxic gases during use.

It is another object of the present invention to provide binder compositions for mold making which permit the reuse of reclaimed sand without causing defects or loss of strength in the casting mold.

It is another object of the present invention to provide binder/curing agent compositions for mold making which contains a curing agent and such a binder composition.

It is another object of the present invention to provide sand compositions for mold making which contains sand and such a binder compositions.

It is another object of the present invention to provide a process for making a mold using such a sand composition.

These and other objects, which will become apparent during the following detailed description, have been achieved by the inventors' discovery that a binder composition containing a specific curing accelerator exhibits an increased curing rate on contact with a curing agent to provide a mold with an increased initial strength. They also have found that a combination of such a binder composition and a specific curing agent composition provides a composition exhibiting a further increased curing rate while avoiding accumulation of a large quantity of phosphorus in reclaimed sand and suppressing generation of poisonous decomposition products, such as sulfur-containing gas. The present invention has been completed based on these findings.

Thus, the present invention provides a binder composition for mold making which comprises:

(a) a binder comprising an acid-curable resin, and (b) from 0.5 to 63.0% by weight, based on the weight of the binder composition, of at least one curing accelerator selected from compounds represented by formula (1):

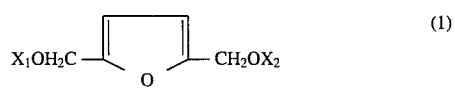

wherein $X_1$, $X_2$ each independently represent a hydrogen atom, a methyl group or an ethyl group.

The present invention further provides a binder/curing agent composition for mold making which comprises:

(i) a binder composition comprising:

(a) a binder comprising an acid-curable resin, and (b) from 0.5 to 63.0% by weight, based on the total amount of binder (a) and curing accelerator (b), of at least one curing accelerator selected from compounds represented by formula (1); and (ii) a curing agent composition comprising a phosphorus-containing compound and a sulfur-containing compound at such a weight ratio that a weight ratio of sulfur atoms to the total weight of phosphorus atoms and sulfur atoms is from 0.01 to 0.7.

The present invention furthermore provides a sand composition for mold making containing the above-mentioned binder composition or binder/curing agent composition.

The present invention furthermost provides a process for making a mold by using the above-mentioned sand composition.

DETAILED DESCRIPTION OF THE PREFERRED EMBODIMENTS

The binder composition for molding making (hereinafter simply referred to as a binder composition) comprises (a) a binder comprising an acid-curable resin and (b) a curing accelerator.

Curing accelerator (b) is a compound represented by formula (1) or a mixture of two or more of the compounds of formula (1). Preferred examples of the compound of formula (1) include 2,5-bishydroxymethylfuran (hereinafter sometimes referred to as bishydroxymethylfuran), 2,5-bis-methoxymethylfuran (hereinafter sometimes referred to as bismethoxymethylfuran), 2,5-bisethoxymethylfuran (hereinafter sometimes referred to as bisethoxymethylfuran), 2-hydroxymethyl-5-methoxymethylfuran, 2-hydroxymethyl-5-ethoxymethylfuran, and 2-methoxymethyl-5-ethoxymethylfuran. Among them, 2,5-bishydroxymethylfuran is more preferred since it is more reactive than 2,5-bismethoxymethylfuran or 2,5-bisethoxymethylfuran in acceleration of the curing reaction of the binder comprising an acid-curable resin. The higher reactivity of 2,5-bishydroxymethylfuran is attributed to the methylol group which contributes to a curing reaction. More specifically, 2,5-bismethoxymethylfuran or the like is less reactive because its alkoxy group once undergoes hydrolysis to form a methylol group, which then contributes to a curing reaction. Although it is known that the reaction between furfuryl alcohol and formaldehyde in the preparation of a furan resin is attended by formation of 2,5-bishydroxymethylfuran as an initial condensation product (see *KOBUNSHI YAKUZAI NYUMON*, published by Sanyo Chemical Industries, Co., Ltd.), it has not yet come to be known that this 2,5-bishydroxymethylfuran performs the function as a curing accelerator for an acid-curable resin used in mold making. The compound of formula (1) may be prepared in a known method as disclosed, for example, in Blanksma, Rec. Trav. Chim., 29, 403 (1910), Middendorp., Rec. Tray. Chim., 38, 1 (1919), Newth and Wiggins, Research (London), 3, Suppln. 50-1 (1950), or C. A., 44, 6848 (1950).

Curing accelerator (b) is preferably used in an amount of from 0.5 to 63.0% by weight, preferably from 1.8 to 50.0% by weight, more preferably from 2.5 to 50.0% by weight, furthermore preferably from 5.0 to 40% by weight, and still furthermore preferably from 10.0 to 40.0% by weight, based on the weight of the binder composition. If the amount of curing accelerator (b) is less than 0.5% by weight, the curing reaction of binder (a) is not accelerated sufficiently, and the initial strength of the resulting mold cannot be improved satisfactorily. If it exceeds 63.0% by weight, the proportion of binder (a) becomes relatively small. It follows that curing accelerator (b) is not easily dissolved in binder (a), and sedimentation would occur in the binder composition.

The binder composition contains an acid-curable resin as binder (a), preferably in an amount of 40 to 99.5% by weight, more preferably from 50 to 95% by weight and furthermore preferably 60 to 90% by weight, based on the weight of the binder composition. Any conventional acid-curable resin may be used either individually or in combination of two or more thereof. Specific examples of useful acid-curable resin include furfuryl alcohol, a furfuryl alcohol/aldehyde polycondensate, a phenol/aldehyde polycondensate, a melamine/aldehyde polycondensate, a urea/aldehyde polycondensate, and mixtures thereof. Co-condensation products of two or more of the above-mentioned polycondensates may also be used as an acid-curable resin.

The aldehyde to be polycondensed with the furfuryl alcohol, phenol, melamine or urea is conventional and examples thereof include formaldehyde, glyoxal, and furfural. Among them, formaldehyde is preferred in the present invention.

The weight average molecular weight of furfuryl alcohol/aldehyde polycondensate is preferably from 200 to 2,000, more preferably from 200 to 1,500. When the weight average molecular weight is less than 200, the curing rate of the binder is lowered, whereby the initial strength of the resulting mold tends to be lower. On the other hand, when the weight average molecular weight is higher than 2,000, the viscosity of the binder composition increases, whereby the mulling characteristic of the resulting sand composition deteriorates, which may result in a decrease in the strength of the resulting mold.

The phenol to be polycondensed with an aldehyde is also conventional and examples thereof include phenol, resorcinol, bisphenol A, bisphenol F, a compound represented by formula (2) shown below, a compound represented by formula (3) shown below, and mixtures of two or more thereof.

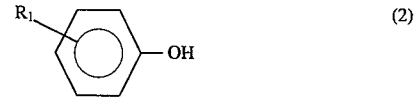

(2)

wherein $R_1$ represents a hydrocarbon group having from 1 to 10 carbon atoms.

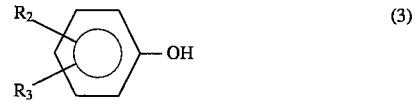

(3)

wherein $R_2$ and $R_3$ each independently represent a hydrocarbon group having from 1 to 10 carbon atoms.

The phenol/aldehyde polycondensate is preferably the one prepared by charging a phenolic monomer in a proportion of from 2 to 40% by weight based on the total weight of the monomers. So, the unit derived from the phenolic monomer in the binder comprising the resulting phenol/aldehyde polycondensate is preferably from 2 to 40% by weight. If the phenolic monomer unit content is less than 2% by weight, the curing rate becomes relatively slow, tending to reduce the initial strength of the resulting mold. If it exceeds 40% by weight, the binder composition has an increased viscosity which reduces the storage stability.

The weight average molecular weight of the phenol/aldehyde polycondensate is preferably from 200 to 3,000, more preferably from 200 to 2,000. When the weight average molecular weight is less than 200, the curing rate of the binder is lowered, whereby the initial strength of the resulting mold tends to be lower. On the other hand, when the weight average molecular weight is higher than 3,000, the viscosity of the binder composition increases, whereby the mulling characteristic of the resulting sand composition deteriorates, which may result in a decrease in the resulting mold strength.

In using a urea/aldehyde polycondensate as an acid-curable resin, it is preferable that urea bonded to an aldehyde be present in a given proportion. That is, urea is preferably used in the binder composition in such an amount that the nitrogen atom of urea origin may be present in the binder composition in a proportion of from 0.1 to 6.0% by weight, and particularly from 0.1 to 4.5% by weight, based on the total weight of the binder composition. Use of the urea/aldehyde polycondensate having such an amount of nitrogen tends to improve the final strength of the resulting mold. If the urea is used in such an amount that the nitrogen content is less than 0.1% by weight, such a tendency to improve the final strength is not shown any more. If the urea is used in such a large amount that the nitrogen content exceeds 6.0% by weight, the resulting mold tends to have a disadvantage in that castings obtained by using the casting mold often suffer from casting defect, such as pinholes. While the nitrogen content of urea origin has been referred to with respect to a urea/aldehyde polycondensate, the same preferred nitrogen content applies to other acid-curable resins. The nitrogen content of the binder composition can be measured by the Kjeldahl method.

The weight average molecular weight of the urea/aldehyde polycondensate is preferably from 100 to 2,000, more preferably from 200 to 1,000. If the weight average molecular weight is less than 100, the curing rate of the binder is low, whereby the initial strength of the resulting mold tends to be lower. On the other hand, if the weight average molecular weight is higher than 2,000, the viscosity of the binder composition increases, whereby the mulling characteristic of the resulting sand composition deteriorates, which may result in a decrease in the strength of the resulting mold.

The weight average molecular weight of the melamine/aldehyde polycondensate is preferably from 200 to 2,000, more preferably from 200 to 1,500. If the weight average molecular weight is less than 200, the curing rate of the binder composition is low, whereby the initial strength of the resulting mold tends to be lower. On the other hand, if the weight average molecular weight is higher than 2,000, the viscosity of the binder composition increases, whereby the mulling characteristic of the resulting sand composition deteriorates, which may result in a decrease in the strength of the resulting mold.

The binder composition of the present invention preferably has a water content of from 0.5 to 30.0% by weight, more preferably from 0.5 to 10.0% by weight, based on the total weight of the binder composition. This water content serves to reduce the viscosity of the binder composition for easier handling. If the water content is less than 0.5% by weight, the decrease in the viscosity of the binder composition tends to insufficient. A water content exceeding 30% by weight tends to interfere with the curing reaction of the acid-curable resin, resulting in insufficient improvement in initial strength of the resulting mold. The water content of the binder composition can be determined by the Karl Fischer's method.

The binder composition can be prepared by mixing the acid-curable resin, such as furfuryl alcohol, and curing accelerator (b) comprising the compound of formula (1).

The acid-curable resin, such as furfuryl alcohol, and the compound of formula (1) may be prepared simultaneously to give a binder composition comprising the acid-curable resin and curing accelerator (b) consequently. The above-mentioned preferred water content may be supplied either by external addition of water or by producing water simultaneously with the preparation of the acid-curable resin.

If desired, the binder composition of the present invention may further contain various known modifiers or additives in addition to components (a) and (b).

Mold making by the use of the aforesaid binder composition is generally carried out as follows. A binder composition of the present invention and a curing agent composition for curing the binder composition are mixed with a granular refractory material and mulling the resulting mixture to prepare a sand composition for mold making. The order of addition is not limited. For example, addition of the binder composition may be followed by addition of the curing agent composition, or vise versa, or the binder composition and the curing agent composition may be added simultaneously. While not limiting, the binder composition and the curing agent composition are generally added in an amounts of from about 0.6 to 5 parts by weight (preferably from 0.6 to 3 parts by weight) and from about 0.2 to 3 parts by weight (preferably from 0.2 to 2 parts by weight), respectively, per 100 parts of the granular refractory material. The curing agent composition to be added may previously contain conventional additives, for example, a known curing accelerator.

The granular refractory material which can be used in the present invention is conventional and examples thereof includes fresh or reclaimed sands, such as silica sand (mainly composed of quartz), chromite sand, zircon sand, olivine sand, alumina sand, mullite sand, and synthetic mullite sand. Reclaimed sands include those obtained by mechanical reclamation or thermal reclamation. Mechanical reclamation achieves a high yield and is economically advantageous and customary, and thus is preferred. Such reclaimed sand is preferably used in the present invention.

The curing agent composition which can be used in combination with the binder composition of the present invention includes a conventional phosphorus-containing compound (e.g., phosphoric acid, condensed phosphoric acid, phosphoric esters (methyl phosphate) and phosphates (calcium phosphate or potassium hydrogenphosphate)), a conventional sulfur-containing compound (e.g., a sulfonic acid compound (methanesulfonic acid, ethanesulfonic acid, phenolsulfonic acid, benzenesulfonic acid, toluenesulfonic acid, xylenesulfonic acid, etc.) and sulfuric acid), and a mixture of two or more thereof. In particular, a phosphorus-containing compound or a mixture thereof is preferred. As compared with a sulfur-containing curing agent composition, phosphorus-containing curing agent compositions have lower acid strength and therefore a lower curing rate but, on the other hand, produce less poisonous gas on pouring a casting material and therefore are favorable for the working environment. Although it has a lower curing rate, it gives rise to no great problem by virtue of the improvement in curing rate of the binder composition of the present invention per se.

If yet a further improvement in curing rate being desired, it is recommended to use a phosphorus-containing compound excellent in the working environment in combination with a sulfur-containing compound having a high acid strength and capable of accelerating curing. The curing agent system comprising a phosphorus-containing compound and a sulfur-containing compound will hereinafter be referred to as a curing agent composition.

Examples of the phosphorus-containing compound which can be used in the curing agent composition of the present invention includes phosphoric acid, condensed phosphoric acid, a phosphoric ester (e.g., methyl phosphate or ethyl phosphate) and a phosphate (e.g., calcium phosphate or potassium hydrogenphosphate) and mixtures thereof. Examples of the sulfur-containing compound which can be used in the curing agent composition of the present invention includes sulfuric acid, methanesulfonic acid, ethanesulfonic acid, phenolsulfonic acid, benzenesulfonic acid, toluenesulfonic acid, xylenesulfonic acid, and mixtures thereof.

In the curing agent composition, the phosphorus-containing compound and the sulfur-containing compound are preferably present at such a ratio that the weight ratio of sulfur atoms to the total weight of phosphorus atoms and sulfur atoms is from 0.01 to 0.7. In other words, the weight of sulfur atoms is preferably from 1/99 to 7/3 of the weight of phosphorus atoms. If the sulfur content is less than this range, meaning that the phosphorus content is higher than the range, phosphorus is liable to accumulate in reclaimed sand in a large quantity, resulting in casting defects, such as pinholes. In addition, the sand will considerably absorb moisture due to the accumulated phosphorus, leading to interfere the curing of the acid-curable resin. If the sulfur content is more than that range, too large an amount of the sulfur-containing compound is liable to result in the release of poisonous decomposition products upon pouring of a casting material, resulting in deterioration of the working environment. It is particularly preferred to adjust the weight ratio of sulfur atoms to the total weight of phosphorus atoms and sulfur atoms within a range of from 0.03 to 0.6.

For the purpose of further improving mold strength, a silane coupling agent may be added to the granular refractory material. Examples of the silane coupling agents include (2-amino)aminopropylmethyldimethoxysilane, γ-aminopropyltrimethoxysilane, γ-aminopropyltriethoxysilane, and γ-glycidoxypropyltrimethoxysilane. The silane coupling agent may previously be incorporated into the binder composition.

The thus prepared sand composition for mold making (hereinafter simply referred to as a sand composition) can generally be used for production of molds by self-hardening casting mold making. That is, the sand composition is charged in a prescribed pattern, and the binder composition is allowed to cure by the action of the curing agent to obtain a mold. The binder composition of the present invention exhibits a relatively high curing rate so that it takes only about 30 minutes to 1 hour from pattern filling to removal from the pattern. Castings of high quality can be produced by pouring a casting material into the thus obtained casting mold. Neither heating nor cooling is needed in mixing of materials, molding, or curing, and all these steps may be conducted at ambient temperature.

The present invention will now be illustrated in greater detail with reference to Examples, but it should be understood that the present invention is not construed as being limited thereto. All the parts and percents are given by weight unless otherwise indicated.

EXAMPLES

Examples 1 to 12 and Comparative Examples 1 to 3

Furfuryl alcohol (acid-curable resin) was mixed with a curing accelerator shown in Table 1 below (e.g., 2,5-bishydroxymethylfuran ("2,5-Furandimethanol" produced by Aldrich Fine Chemical Co.; CAS registration number: 1883-75-6)) in an amount shown in Table 1 to prepare a binder composition. To 100 parts of silica sand ("Kaketsu Fusen No. 5") were added 1 part of the binder composition and 0.45 part of a curing agent (a 70% aqueous solution of toluenesulfonic acid), and the mixture was mulled to obtain a sand composition.

The resulting sand composition was charged in a test piece frame of 50 mm in diameter and 50 mm in height at 25° C. and maintained for 1 hour or 24 hours. The compressive strength of the thus obtained mold was measured in accordance with JIS Z 2604-1976 (the term "JIS" means "Japanese Industrial Standard"). The results obtained are shown in Table 1 below.

TABLE 1

| Example No. | Curing Accelerator Kind | Amount (wt %) | Compressive Strength After 1 Hr. (kg/cm$^2$) | After 24 Hrs. (kg/cm$^2$) |
| --- | --- | --- | --- | --- |
| Example 1 | bishydroxymethylfuran | 0.5 | 5.1 | 32.8 |
| Example 2 | bishydroxymethylfuran | 2.5 | 7.3 | 33.5 |
| Example 3 | bishydroxymethylfuran | 5.0 | 8.8 | 34.5 |
| Example 4 | bishydroxymethylfuran | 7.5 | 10.2 | 36.5 |
| Example 5 | bishydroxymethylfuran | 10.0 | 11.4 | 38.0 |
| Example 6 | bishydroxymethylfuran | 20.0 | 17.7 | 42.5 |
| Example 7 | bishydroxymethylfuran | 30.0 | 24.8 | 48.3 |
| Example 8 | bishydroxymethylfuran | 40.0 | 28.1 | 52.6 |
| Example 9 | bishydroxymethylfuran | 50.0 | 26.8 | 51.2 |
| Example 10 | bishydroxymethylfuran | 60.0 | 25.6 | 46.8 |
| Example 11 | bishydroxymethylfuran + bismethoxymethylfuran | 20.0 1.5 | 18.1 | 43.2 |
| Example 12 | bishydroxymethylfuran + bismethoxymethylfuran | 15.0 1.0 | 15.5 | 40.0 |
| Comparative Example 1 | bishydroxymethylfuran | 0.3 | 3.2 | 29.8 |
| Comparative Example 2 | none | — | 3.2 | 29.4 |
| Comparative Example 3 | bishydroxymethylfuran | 65.0 | unmeasurable due to non-uniformity | |

As is apparent from the results in Table 1, when the binder composition containing the curing accelerator of the present invention is used, the mold strength after 1 hour increases, and that after 24 hours also increases. As the content of the curing accelerator is gradually increased from 0.5% by weight, the strength of the mold also gradually increases, reaching the maximum at 50% by weight. As the curing accelerator content is further increased, the mold strength gradually decreases. If the curing accelerator content exceeds 65% by weight, the binder composition becomes non-uniform. At a curing accelerator content below 0.5% by weight, the improvement in mold strength is not so great.

Examples 13 to 24 and Comparative Examples 4 to 6

A test piece was prepared in the same manner as in Examples 1 to 12, except for using an equivalent weight mixture of a 70% aqueous solution of toluenesulfonic acid and a 85% aqueous solution of phosphoric acid as a curing agent composition. The compressive strengths of the resulting test pieces measured in the same manner as in Example 1 are shown in Table 2 below.

TABLE 2

| Example No. | Curing Accelerator Kind | Amount (wt %) | Compressive Strength After 1 Hr. (kg/cm$^2$) | Compressive Strength After 24 Hrs. (kg/cm$^2$) |
|---|---|---|---|---|
| Example 13 | bishydroxy-methylfuran | 0.5 | 5.4 | 33.5 |
| Example 14 | bishydroxy-methylfuran | 2.5 | 7.7 | 34.2 |
| Example 15 | bishydroxy-methylfuran | 5.0 | 9.2 | 35.1 |
| Example 16 | bishydroxy-methylfuran | 7.5 | 10.6 | 37.3 |
| Example 17 | bishydroxy-methylfuran | 10.0 | 11.9 | 38.6 |
| Example 18 | bishydroxy-methylfuran | 20.0 | 18.1 | 43.3 |
| Example 19 | bishydroxy-methylfuran | 30.0 | 25.5 | 49.1 |
| Example 20 | bishydroxy-methylfuran | 40.0 | 29.0 | 53.0 |
| Example 21 | bishydroxy-methylfuran | 50.0 | 27.2 | 52.0 |
| Example 22 | bishydroxy-methylfuran | 60.0 | 25.8 | 47.4 |
| Example 23 | bishydroxy-methylfuran + bismethoxy-methylfuran | 20.0 1.5 | 18.4 | 43.7 |
| Example 24 | bishydroxy-methylfuran + bismethoxy-methylfuran | 15.0 1.0 | 16.0 | 40.6 |
| Comparative Example 4 | bishydroxy-methylfuran | 0.3 | 3.3 | 30.4 |
| Comparative Example 5 | none | — | 3.0 | 30.1 |
| Comparative Example 6 | bishydroxy-methylfuran | 65.0 | unmeasurable due to non-uniformity | |

As can be seen from Table 2, when the binder composition containing the curing accelerator of the present invention is used, the mold strength after 1 hour increases, and that after 24 hours also increases. As the content of the curing accelerator is gradually increased from 0.5% by weight, the strength of the mold also gradually increases, reaching the maximum at 40% by weight. As the curing accelerator content is further increased, the mold strength gradually decreases. When the curing accelerator content exceeds 65% by weight, the binder composition becomes non-uniform. At a curing accelerator content below 0.5% by weight, the improvement in mold strength is not so great.

PREPARATION OF BINDER COMPOSITIONS
1–15

Furfuryl alcohol or a mixture of furfuryl alcohol and an acid-curable resin selected from a furfuryl alcohol/aldehyde polycondensate, a phenol/aldehyde polycondensate, a melamine/aldehyde polycondensate and a urea/aldehyde polycondensate was prepared as a binder. Binder compositions 1 to 15 were prepared using the binder and other components as shown in Table 3 below. In the Table, the amounts of the binder, water, curing accelerator and other component are given by % by weight based on the total weight of the composition. The nitrogen content is given in terms of % by weight of nitrogen atoms based on the total atoms in the composition.

The binders, such as a furfuryl alcohol/aldehyde polycondensate, were prepared as follows.

Preparation of Furfuryl Alcohol/Aldehyde Polycondensate:

Furfuryl alcohol and aldehyde were reacted under an acidic condition for a prescribed period of time in a conventional manner to prepare a furfuryl alcohol/aldehyde polycondensate.

Preparation of Phenol/Aldehyde Polycondensate:

Phenol and an aldehyde were reacted under a basic condition for a prescribed period of time in a conventional manner. After completion of the reaction, the reaction mixture was neutralized with a p-toluenesulfonic acid aqueous solution to obtain a phenol/aldehyde polycondensate.

Preparation of Melamine/Aldehyde Polycondensate:

Melamine and aldehyde were reacted under a basic condition for a prescribed period of time in a conventional manner. After completion of the reaction, the reaction mixture was neutralized with a p-toluenesulfonic acid aqueous solution to obtain a melamine/aldehyde polycondensate.

Preparation of Urea/Aldehyde Polycondensate:

Urea and an aldehyde were reacted under a basic condition for a prescribed period of time in a conventional manner. After completion of the reaction, the reaction mixture was neutralized with a p-toluenesulfonic acid aqueous solution to obtain a urea/aldehyde polycondensate.

In the present invention including the Examples and Comparative Examples herein, each characteristic was measured in the following manner.

Content (ratio) of Furfuryl Alcohol and Compound of Formula (1), e.g., 2,5-bishydroxymethylfuran:

It was measured by gas chromatography under the following conditions:

| Chromatograph: | GC-14A, manufactured by Shimadzu Corporation |
|---|---|
| Column: | PEG-20M chromosorb WAW DMCS 10% 60/80 mesh; 0.5 m × 3 mm ⌀ |
| Detector: | FID |
| Carrier gas: | He |

Water Content:

It was measured by Karl Fischer's method.

Content of Phenolic Monomer Unit (e.g., phenol) in terms of Amount of Raw monomer:

It was measured with an ultraviolet spectrophotometer.

Nitrogen content:

It was measured by the Kjeldahl method.

TABLE 3

| Component (wt %) | 1 | 2 | 3 | 4 | 5 | 6 | 7 | 8 |
|---|---|---|---|---|---|---|---|---|
| Binder: | | | | | | | | |
| Furfuryl alcohol | 57.5 | 50.3 | 61.7 | 84.4 | 35.8 | 35.5 | 43.6 | 56.7 |
| Furfuryl alcohol/formaldehyde polycondensate | 22.0 | 15.7 | 8.2 | 3.7 | 14.5 | 12.4 | 18.9 | 6.6 |
| Urea/formaldehyde polycondensate | — | 12.9 | 12.5 | 5.5 | 20.1 | 14.3 | 1.6 | 11.9 |
| Phenol/formaldehyde polycondensate | — | — | — | — | — | — | — | 8.1 |
| Melamine/formaldehyde polycondensate | — | — | — | — | — | — | — | — |
| Phenol/furfural polycondensate | — | — | — | — | — | — | — | — |
| Urea/glyoxal polycondensate | — | — | — | — | — | — | — | — |
| Water Content | 5.0 | 6.0 | 4.0 | 1.4 | 6.2 | 12.6 | 0.7 | 4.2 |
| Bishydroxymethylfuran (curing accelerator) | 15.5 | 15.1 | 13.6 | 5.0 | 23.4 | 25.2 | 35.2 | 12.5 |
| Nitrogen Content | — | 2.5 | 2.5 | 0.9 | 3.8 | 3.0 | 0.3 | 2.3 |
| Other Component | | | | | | | | |
| Phenol Content (in terms of amount of raw monomer) | — | — | — | — | — | — | — | 4.5 |

| Component (wt %) | 9 | 10 | 11 | 12 | 13 | 14 | 15 |
|---|---|---|---|---|---|---|---|
| Binder: | | | | | | | |
| Furfuryl alcohol | 53.0 | 46.8 | 58.9 | 59.4 | 100.0 | 74.7 | 74.8 |
| Furfuryl alcohol/formaldehyde polycondensate | 10.2 | — | 10.6 | — | — | 18.8 | — |
| Urea/formaldehyde polycondensate | 12.2 | 8.2 | — | — | — | — | 17.2 |
| Phenol/formaldehyde polycondensate | — | — | — | — | — | — | — |
| Melamine/formaldehyde polycondensate | 3.0 | — | — | — | — | — | — |
| Phenol/furfural polycondensate | — | — | 9.1 | — | — | — | — |
| Urea/glyoxal polycondensate | — | — | — | 6.0 | — | — | — |
| Water Content | 3.8 | 2.2 | 3.8 | 2.3 | 0.0 | 6.2 | 8.0 |
| Bishydroxymethylfuran (curing accelerator) | 17.8 | 42.8 | 17.6 | 32.3 | — | 0.3 | — |
| Nitrogen Content | 2.5 | 0.7 | — | 0.5 | — | — | 3.6 |
| Phenol monomer (other component) | — | — | 4.5 | — | — | — | — |

Examples 25 to 36 and Comparative Examples 7 to 9

A test piece was prepared in the same manner as in Examples 1 to 13, except for using each of binder compositions 1 to 15. The compressive strength of the resulting test piece is shown in Table 4 below.

TABLE 4

| | | Compressive Strength | |
|---|---|---|---|
| Example No. | Binder Composition | After 1 Hr. (kg/cm$^2$) | After 24 Hrs. (kg/cm$^2$) |
| Example 25 | 1 | 13.8 | 35.8 |
| Example 26 | 2 | 13.2 | 37.7 |
| Example 27 | 3 | 12.8 | 40.2 |
| Example 28 | 4 | 8.5 | 36.0 |
| Example 29 | 5 | 13.2 | 37.0 |
| Example 30 | 6 | 9.2 | 36.6 |
| Example 31 | 7 | 18.7 | 35.2 |
| Example 32 | 8 | 13.0 | 38.7 |
| Example 33 | 9 | 15.4 | 38.2 |
| Example 34 | 10 | 25.1 | 48.7 |
| Example 35 | 11 | 14.7 | 38.0 |
| Example 36 | 12 | 24.8 | 47.2 |
| Comparative Example 7 | 13 | 3.0 | 29.4 |
| Comparative Example 8 | 14 | 3.3 | 27.8 |
| Comparative Example 9 | 15 | 3.5 | 30.2 |

As can be seen from Table 4, when the binder composition containing a prescribed amount of 2,5-bishydroxymethylfuran is used, the resulting mold has a relatively high initial strength and a satisfactory strength after 24 hours, though showing some scatter depending on the kind of the binder. To the contrary, when using the binder composition containing no or an extremely small amount of 2,5-bishydroxymethylfuran, the mold has a low strength either in the initial stage or after 24 hours, irrespective of the kind of the binder.

Examples 37 to 48 and Comparative Example 10

A binder composition was prepared by adding the curing accelerator shown in Table 5 below to a furfuryl alcohol/formaldehyde polycondensate containing 0.3% by weight of bishydroxymethylfuran in an amount shown in Table 5. A test piece was obtained in the same manner as in Examples 1 to 12, except for using the thus prepared binder composition. The compressire strengths of the resulting test pieces are shown in Table 5.

TABLE 5

| Example No. | Curing Accelerator Kind | Amount (wt %) | Compressive Strength After 1 Hr. (kg/cm²) | After 24 Hrs. (kg/cm²) |
|---|---|---|---|---|
| Example 37 | bishydroxy-methylfuran | 0.5 | 5.3 | 29.6 |
| Example 38 | bishydroxy-methylfuran | 2.5 | 7.8 | 30.2 |
| Example 39 | bishydroxy-methylfuran | 5.0 | 9.2 | 31.1 |
| Example 40 | bishydroxy-methylfuran | 7.5 | 10.4 | 32.9 |
| Example 41 | bishydroxy-methylfuran | 10.2 | 11.7 | 34.3 |
| Example 42 | bishydroxy-methylfuran | 21.7 | 18.0 | 38.3 |
| Example 43 | bishydroxy-methylfuran | 32.5 | 25.3 | 43.5 |
| Example 44 | bishydroxy-methylfuran | 41.8 | 28.4 | 47.4 |
| Example 45 | bishydroxy-methylfuran | 50.3 | 27.1 | 46.2 |
| Example 46 | bishydroxy-methylfuran | 62.1 | 25.9 | 42.2 |
| Example 47 | bishydroxy-methylfuran + bismethoxy-methylfuran | 22.4 / 1.5 | 18.3 | 38.9 |
| Example 48 | bishydroxy-methylfuran + bismethoxy-methylfuran | 15.0 / 1.0 | 15.7 | 36.1 |
| Comparative Example 10 | bishydroxy-methylfuran | 0.3 | 3.4 | 26.9 |

As can be seen from the results in Table 5, when the binder composition containing the curing accelerator of the present invention is used, the resulting mold has an increased strength both after 1 hour and after 24 hours. As the content of the curing accelerator is gradually increased from 0.5% by weight, the strength of the mold also gradually increases, reaching the maximum at about 40% by weight. As the curing accelerator content is further increases, the mold strength gradually decreases. At the curing accelerator content below 0.5% by weight, the improvement in mold strength is not so great.

Examples 49 to 60 and Comparative Examples 11 to 13

A test piece was prepared in the same manner as in Examples 1 to 12, except for using a 85% by weight phosphoric acid aqueous solution as a curing agent. Differing from Examples 1 to 12, the compressive strengths of the resulting sample molds after an elapse of 2 hours and 24 hours were measured in these Examples and Comparative Examples. The results obtained are shown in Table 6.

TABLE 6

| Example No. | Curing Accelerator Kind | Amount (wt %) | Compressive Strength After 2 Hr. (kg/cm²) | After 24 Hrs. (kg/cm²) |
|---|---|---|---|---|
| Example 49 | bishydroxy-methylfuran | 0.5 | 4.2 | 32.1 |
| Example 50 | bishydroxy-methylfuran | 2.5 | 6.0 | 32.8 |
| Example 51 | bishydroxy-methylfuran | 5.0 | 7.2 | 33.8 |
| Example 52 | bishydroxy-methylfuran | 7.5 | 8.3 | 35.8 |
| Example 53 | bishydroxy-methylfuran | 10.0 | 9.3 | 37.2 |
| Example 54 | bishydroxy-methylfuran | 20.0 | 14.5 | 41.7 |
| Example 55 | bishydroxy-methylfuran | 30.0 | 20.3 | 47.3 |
| Example 56 | bishydroxy-methylfuran | 40.0 | 23.0 | 51.5 |
| Example 57 | bishydroxy-methylfuran | 50.0 | 21.9 | 50.2 |
| Example 58 | bishydroxy-methylfuran | 60.0 | 20.9 | 45.9 |
| Example 59 | bishydroxy-methylfuran + bismethoxy-methylfuran | 20.0 / 1.5 | 14.8 | 42.3 |
| Example 60 | bishydroxy-methylfuran + bismethoxy-methylfuran | 15.0 / 1.0 | 12.7 | 39.2 |
| Comparative Example 11 | bishydroxy-methylfuran | 0.3 | 2.6 | 29.2 |
| Comparative Example 12 | bishydroxy-methylfuran | 0 | 2.5 | 28.8 |
| Comparative Example 13 | bishydroxy-methylfuran | 65.0 | unmeasurable due to non-uniformity | |

As is apparent from Table 6, when the binder composition containing the curing accelerator of the present invention is used, the resulting sample mold has an increased strength either after 2 hours or 24 hours. As the content of the curing accelerator is gradually increased from 0.5% by weight, the strength of the mold also gradually increases, reaching the maximum at 40% by weight. As the curing accelerator content is further increased, the mold strength gradually decreases. When the curing accelerator content exceeds 65% by weight, the binder composition becomes non-uniform. At a curing accelerator content below 0.5% by weight, the improvement in mold strength is not so great. It is also seen that use of phosphoric acid as a curing agent causes a reduction in initial mold strength (strength after an elapse of 1 to 2 hours) as compared with use of toluenesulfonic acid.

Examples 61 to 65 and Comparative Examples 14 and 15

A binder composition shown in Table 7 below was prepared from a binder comprising furfuryl alcohol, a furfuryl alcohol/formaldehyde polycondensate, and a urea/formaldehyde polycondensate and a curing accelerator. A hundred parts of furan reclaimed sand were mixed and mulled with 0.8 part of the thus prepared binder composition and 0.4 part of a curing agent (60% aqueous solution of xylenesulfonic acid) to prepare a sand composition for mold making. Test pieces were prepared in the same manner as in Examples 1 to 12 using the sand composition. The compressive strengths of the test pieces are shown in Table 7.

TABLE 7

| | Binder Composition for Mold Making | | | | | Compressive Strength | |
|---|---|---|---|---|---|---|---|
| | Binder | | Curing Accelerator | | | | |
| | Furfuryl Alcohol/ | Urea/Form/ | | | | | |
| Example No. | Furfuryl Alcohol (wt %) | Formaldehyde Polycondensate (wt %) | aldehyde Polycondensate (wt %) | Bishydroxy-methylfuran (wt %) | Water Content (wt %) | After 1 Hr. (kg/cm$^2$) | After 24 Hrs. (kg/cm$^2$) |
| Example 61 | 55.6 | 5.9 | 17.5 | 5.0 | 16.0 | 11.8 | 42.0 |
| Example 62 | 46.5 | 5.9 | 17.6 | 10.0 | 20.0 | 10.2 | 40.1 |
| Example 63 | 39.7 | 2.7 | 18.6 | 15.0 | 24.0 | 10.7 | 38.5 |
| Example 64 | 42.1 | 2.7 | 16.2 | 15.0 | 24.0 | 10.9 | 37.8 |
| Example 65 | 35.8 | 2.8 | 16.4 | 17.0 | 28.0 | 8.8 | 34.2 |
| Comparative Example 14 | 56.5 | 5.9 | 17.6 | 0.0 | 20.0 | 3.2 | 37.3 |
| Comparative Example 15 | 52.8 | 2.8 | 16.4 | 0.0 | 28.0 | 0.8 | 31.6 |

As is apparent from Table 7, when the binder composition containing the curing accelerator of the present invention is used, the resulting mold has an increased strength either after 1 hour or after 24 hours.

Examples 66 to 77 and Comparative Examples 16 to 18

A curing agent composition containing 11.3% of sulfuric acid and 38.8% of phosphorus pentoxide was prepared. The [sulfur/(phosphorus+sulfur)] weight ratio was found to be 0.178. Separately, furfuryl alcohol (acid-curable resin) was mixed with a curing accelerator, e.g., 2,5-bishydroxymethylfuran ("2,5-Furandimethanol" produced by Aldrich Fine Chemical Co.; CAS registration number: 1883-75-6) in the amount shown in Table 8 below to prepare a binder composition. To 100 parts of silica sand was added 0.33 part of the curing agent composition, and then 0.65 part of the binder composition was added thereto and the resulting mixture was mulled to obtain a sand composition. The sand composition was molded into a mold, and a casting was obtained using the resulting mold at a mold/molten metal weight ratio of 2.5. Thereafter, the mold was broken, and the recovered sand was crushed in a crusher and reclaimed in an M type rotary reclaimer manufactured by Nippon Chuzo Co., Ltd. to obtain reclaimed sand.

Ninety-five parts of the reclaimed sand and 5 parts of new sand were mixed, and the same amounts of the same curing agent composition and binder composition as used above were added thereto to prepare a sand composition. The cycle consisting of mold making, casting, recovery, and reclamation was repeated 20 times. The sulfur dioxide (SO$_2$) concentration in the working environment was measured at the time of casting of the 20th cycle.

A sand composition prepared in the same manner as described above by using the 20-times reclaimed sand was charged in a pattern for mold making, and the compressive strength of the resulting mold after an elapse of 0.5 hour, 1 hour and 24 hours from the charging was measured. The results obtained are shown in Table 8.

TABLE 8

| | Curing Accelerator | | Compressive Strength | | |
|---|---|---|---|---|---|
| Example No. | Kind | Amount (wt %) | After 0.5 Hr (kg/cm$^2$) | After 1.0 Hr (kg/cm$^2$) | After 24 Hrs (kg/cm$^2$) |
| Example 66 | bishydroxy-methylfuran | 0.5 | 1.5 | 5.3 | 32.8 |
| Example 67 | bishydroxy-methylfuran | 2.5 | 2.2 | 7.6 | 33.9 |
| Example 68 | bishydroxy-methylfuran | 5.0 | 3.8 | 9.0 | 34.7 |
| Example 69 | bishydroxy-methylfuran | 7.5 | 4.5 | 9.8 | 37.0 |
| Example 70 | bishydroxy-methylfuran | 10.0 | 4.9 | 10.6 | 38.5 |
| Example 71 | bishydroxy-methylfuran | 20.0 | 6.2 | 16.8 | 43.1 |
| Example 72 | bishydroxy-methylfuran | 30.0 | 7.0 | 23.7 | 48.6 |
| Example 73 | bishydroxy-methylfuran | 40.0 | 9.3 | 27.6 | 52.3 |
| Example 74 | bishydroxy-methylfuran | 50.0 | 7.1 | 25.3 | 50.2 |
| Example 75 | bishydroxy-methylfuran | 60.0 | 6.8 | 23.2 | 46.8 |
| Example 76 | bishydroxy-methylfuran + bismethoxy-methylfuran | 20.0 + 1.0 | 5.7 | 16.5 | 43.1 |
| Example 77 | bishydroxy-methylfuran + bismethoxy-methylfuran | 15.0 + 1.0 | 5.0 | 15.2 | 40.0 |
| Comparative Example 16 | bishydroxy-methylfuran | 0.3 | 0 | 2.8 | 30.2 |
| Comparative Example 17 | — | — | 0 | 2.5 | 29.8 |
| Comparative Example 18 | bishydroxy-methylfuran | 65.0 | unmeasurable due to non-uniformity | | |

As is apparent from Table 8, when the binder composition containing the curing accelerator of the present invention is used, the resulting sample mold has an increased strength either after 0.5 hour, 1 hour or 24 hours. As the content of the curing accelerator is gradually increased from 0.5% by weight, the strength of the mold also gradually increases, reaching the maximum at 40% by weight. As the curing accelerator content is further increased, the mold strength gradually decreases. When the curing accelerator content exceeds 65% by weight, the binder composition becomes non-uniform. At the curing accelerator content below 0.5% by weight, the improvement in mold strength is not so great.

Examples 78 to 83 and Reference Examples 1 and 2

Curing agent compositions were prepared from a sulfur-containing compound and $P_2O_5$ as a phosphorus-containing compound as shown in Table 9 below. In Table 9, the balance the sulfur-containing compound and the phosphorus-containing compound was water. The sulfur content, phosphorus content, and the weight ratio of sulfur to (sulfur+phosphorus) of the curing agent compositions are also shown in Table 9.

The results obtained are shown in Table 10 below.

TABLE 10

| Example No. | Moisture Absorption (%*) | $SO_2$ Generation Quantity (ppm) | Compressive Strength (kg/cm$^2$) | | | Measuring Temp. (°C.) |
|---|---|---|---|---|---|---|
| | | | 0.5 Hr | 1.0 Hr | 24 Hrs | |
| Example 78 | 0.21 | 72.0 | 3.0 | 8.9 | 40.2 | 5 |
| Example 79 | 0.25 | 21.0 | 4.8 | 9.2 | 39.3 | 35 |
| Example 80 | 0.23 | 47.8 | 3.2 | 8.3 | 40.9 | 5 |
| Example 81 | 0.27 | 16.0 | 5.2 | 9.9 | 37.1 | 35 |
| Example 82 | 0.26 | 28.0 | 4.9 | 9.8 | 39.5 | 5 |
| Example 83 | 0.28 | 3.5 | 5.2 | 9.1 | 38.1 | 35 |
| Reference | 0.45 | 1.5 | 0 | 0.6 | 11.5 | 35 |
| Example 1 | | | | | | |
| Reference Example 2 | 0.18 | 95.0 | 2.1 | 8.0 | 37.3 | 5 |

Note:
*Based on the sand

TABLE 9

| Example No. | Curing Agent Composition | | Amount of $P_2O_5$ (wt %) | S Content (wt %) | P Content (wt %) | S/(S + P) |
|---|---|---|---|---|---|---|
| | S-Containing Compound | | | | | |
| | Kind | Amount (wt %) | | | | |
| Example 78 | Methanesulfonic acid | 2.7 | 15.3 | 13.95 | 6.7 | 0.676 |
| | Toluenesulfonic acid | 35.0 | | | | |
| | Sulfuric acid | 20.0 | | | | |
| Example 79 | Ethanesulfonic acid | 2.0 | 15.3 | 3.9 | 6.7 | 0.368 |
| | Phenolsulfonic acid | 14.5 | | | | |
| | Benzenesulfonic acid | 3.2 | | | | |
| Example 80 | Phenolsulfonic acid | 6.8 | 30.7 | 9.25 | 13.4 | 0.408 |
| | Toluenesulfonic acid | 38.6 | | | | |
| | Xylenesulfonic acid | 4.8 | | | | |
| Example 81 | Xylenesulfonic acid | 8.5 | 30.7 | 2.9 | 13.4 | 0.178 |
| | Phenolsulfonic acid | 7.8 | | | | |
| Example 82 | Benzenesulfonic acid | 19.5 | 42.4 | 5.8 | 18.5 | 0.239 |
| | Sulfuric acid | 7.5 | | | | |
| Example 83 | Benzenesulfonic acid | 1.0 | 36.6 | 0.6 | 16.0 | 0.036 |
| | Toluenesulfonic acid | 2.1 | | | | |
| Reference Example 1 | Toluenesulfonic acid | 0.5 | 39.9 | 0.12 | 17.42 | 0.007 |
| | Sulfuric acid | 0.1 | | | | |
| Reference Example 2 | Benzenesulfonic acid | 48.5 | 6.1 | 16.74 | 2.68 | 0.862 |
| | Toluenesulfonic acid | 5.2 | | | | |
| | Sulfuric acid | 18.2 | | | | |

Separately, a binder composition comprising a furan resin (acid-curable resin) having a nitrogen content of 2.5% by weight and 15.0% by weight of bishydroxymethylfuran as a curing accelerator was prepared.

Mold making and reclamation of sand were repeatedly carried out in the same manner as in Examples 66 to 77, except for using each of the curing agent compositions of Table 9, and the compressive strength of the finally obtained mold were evaluated at 5° C. and 35° C. in the same manner as in Examples 66 to 77. The moisture absorption of the reclaimed sand was also determined by allowing the 20-times reclaimed sand to stand at 25° C. under an environment of 90% RH for 24 hours and then measuring the amount of the moisture absorbed to the sand. Further, $SO_2$ generation quantity at the 20-times mold making was measured under a severe condition, as follows.

Measurement of $SO_2$ Generation Quantity:

Immediately after pouring a casting material into a mold having a size of 620 mm×770 mm×530 mmh and the mold/molten metal weight ratio of 2.5, the mold was covered by a wooden box having a size of 900 mm×900 mm×900 mmh and the $SO_2$ concentration was measured by a sensor tube located at the top of the wooden box at 5 minutes after the completion of casting.

Tables 9 and 10 reveal that the reclaimed sand has a high moisture absorption and the resulting mold has a reduced compressive strength when the S/(S+P) weight ratio in the curing agent composition is less than 0.01. It is also proved that the working environment is seriously deteriorated if the S/(S+P) weight ratio exceeds 0.7.

On the other hand, when the curing agent compositions of Examples 78 to 83 are used, the moisture absorption of the reclaimed sand is small, the resulting mold has an increased strength, and also the working environment is satisfactory.

Examples 84 to 95 and Comparative Examples 19 to 21

Test pieces were prepared in the same manner as in Examples 78 to 83 using each of the binder compositions 1 to 15 and the curing agent composition used in Examples 78 to 83. The compressive strengths of the resulting test pieces are shown in Table 11 below.

TABLE 11

| Example No. | Binder Composition | Compressive Strength | | |
|---|---|---|---|---|
| | | 0.5 Hr (kg/cm$^2$) | 1 Hr (kg/cm$^2$) | 24 Hrs (kg/cm$^2$) |
| Example 84 | 1 | 4.8 | 11.3 | 34.4 |
| Example 85 | 2 | 4.5 | 10.8 | 36.2 |
| Example 86 | 3 | 4.2 | 10.5 | 36.8 |
| Example 87 | 4 | 3.8 | 7.0 | 34.6 |
| Example 88 | 5 | 4.3 | 10.8 | 35.5 |
| Example 89 | 6 | 4.0 | 7.5 | 35.1 |
| Example 90 | 7 | 5.8 | 15.3 | 33.8 |
| Example 91 | 8 | 4.5 | 10.6 | 37.1 |
| Example 92 | 9 | 5.1 | 12.7 | 36.7 |
| Example 93 | 10 | 6.5 | 19.8 | 46.5 |
| Example 94 | 11 | 4.8 | 12.1 | 36.5 |
| Example 95 | 12 | 6.4 | 19.6 | 45.3 |
| Comparative Example 19 | 13 | 0 | 3.0 | 28.2 |
| Comparative Example 20 | 14 | 0 | 3.3 | 26.7 |
| Comparative Example 21 | 15 | 0 | 3.5 | 29.0 |

As can be seen from Table 11, when the binder composition containing a prescribed amount of 2,5-bishydroxymethylfuran is used, the resulting mold has a relatively high initial strength and a satisfactory strength after 24 hours, though showing some scatter depending on the acid-curable resin used as a binder. To the contrary, in using the binder composition containing no or an extremely small amount of 2,5-bishydroxymethylfuran, the mold has a low strength either in the initial stage or after 24 hours, irrespective of the kind of the binder.

The binder composition in accordance with the present invention contains a prescribed amount of the compound of formula (1), such as 2,5-bishydroxymethylfuran, as a curing accelerator. The methylol group of the 2,5-bishydroxymethylfuran has high reactivity and, on contact with a curing agent, such as phosphoric acid, undergoes condensation reaction with a methylol group, etc. of the binder to thereby accelerate the curing reaction of the binder. Further, the methoxy group or ethoxy group of 2,5-bismethoxymethylfuran or 2,5-bisethoxymethylfuran undergoes hydrolysis to a hydroxyl group on contact with a curing agent, such as phosphoric acid, and the thus formed hydroxyl group acts in the same manner as described above to accelerate the curing reaction of the binder.

Mold making by the use of the binder composition of the present invention achieves an increased curing rate of the binder to provide a mold having an improved initial strength. Therefore, after filling a pattern with a sand composition containing the binder composition, a mold can be removed from the pattern in a shortened period of time. This means a pattern for mold making can be used efficiently to obtain improved productivity. Further, because the curing rate can be accelerated by altering the composition of the binder composition itself, there is no need to increase the amount of a curing agent or to use a large amount of a highly acidic curing agent. Therefore, molding making can be carried on in a satisfactory working environment.

The curing agent composition for mold making of the present invention contains a sulfur-containing compound and a phosphorus-containing compound at such a specific sulfur to phosphorus weight ratio that the weight ratio of the sulfur-containing compound, which serves to improve the curing rate, can be controlled. When the binder composition of the present invention and the curing agent composition of the present invention are used in combination with a granular refractory material in mold making, a high curing rate of the binder can be assured even with a reduced content of the sulfur-containing compound in the curing agent composition because the binder composition contains a curing accelerator. With the sulfur-containing compound content being so reduced, generation of poisonous gas, such as sulfur dioxide, during mold making is minimized to prevent deterioration of the working environment. Compared with use of a phosphorus-containing compound alone, the combined use of a phosphorus-containing compound and a sulfur-containing compound results in reduction in the requisite amount of the phosphorus-containing compound. As a result, accumulation of a large quantity of phosphorus in repeatedly reclaimed sand can be avoided so that the reclaimed sand can be prevented from absorbing a considerable amount of moisture, which ultimately excludes the possibility that the mold strength obtained from reclaimed sand may have reduced strength. Development of casting defects, such as pinholes, attributed to the presence of a large amount of accumulated phosphorus in the casting mold, can also be prevented.

While the invention has been described in detail and with reference to specific examples thereof, it will be apparent to one skilled in the art that various changes and modifications can be made therein without departing from the spirit and scope thereof.

What is claimed is:

1. A binder composition for mold making which comprises:

(a) a binder comprising an acid-curable resin and (b) from 0.5 to 63.0% by weight, based on the binder composition, of at least one curing accelerator selected from compounds represented by formula (1):

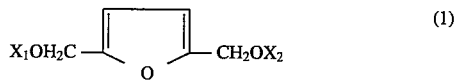

(1)

wherein $X_1$, $X_2$ each independently represent a hydrogen atom, a methyl group or an ethyl group, and wherein said acid-curable resin is at least one compound selected from the group consisting of a phenol/aldehyde polycondensate, a urea/aldehyde polycondensate, and a co-condensate of said phenol/aldehyde and said urea/aldehyde polycondensates.

2. The binder composition of claim 1, wherein said curing accelerator is present in an amount of from 1.8 to 50.0% by weight.

3. The binder composition of claim 1, wherein said aldehyde is selected from the group consisting of formaldehyde, glyoxal and furfural.

4. The binder composition of claim 1, wherein said phenol is selected from the group consisting of phenol, resorcinol, bisphenol A, bisphenol F, a compound represented by formula (2):

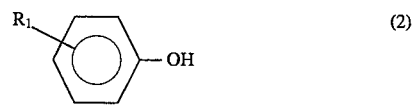

(2)

wherein R₁ represents a hydrocarbon group having from 1 to 10 carbon atoms, and a compound represented by formula (3):

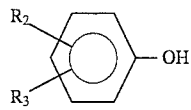

wherein R₂ and R₃ each independently represent a hydrocarbon group having from 1 to 10 carbon atoms.

5. The binder composition of claim 1, wherein said binder composition has a nitrogen content of from 0.1 to 6.0% by weight, based on the weight of the binder composition.

6. The binder composition of claim 1, wherein said acid-curable resin is a phenol/aldehyde polycondensate obtained by condensing an aldehyde with a phenolic monomer in a proportion of from 2 to 40% by weight, based on the combined weight of the aldehyde and phenolic monomer.

7. The binder composition of claim 1, wherein said binder composition has a water content of from 0.5 to 30% by weight, based on the weight of the binder composition.

8. The binder composition of claim 1, wherein said curing accelerator is 2,5-bishydroxymethylfuran.

9. A binder/curing agent composition for casting mold making which comprises:
(i) a binder composition comprising:
(a) a binder comprising an acid-curable resin, and
(b) from 0.5 to 63.0% by weight, based on the total weight of binder (a) and curing accelerator (b), of at least one curing accelerator selected from compounds represented by formula (1):

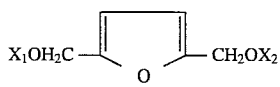

wherein X₁, X₂ each independently represent a hydrogen atom, a methyl group or an ethyl group; and (ii) a curing agent composition comprising a phosphorus-containing compound and a sulfur-containing compound at such a weight ratio that a weight ratio of sulfur atoms to the total weight of phosphorus atoms and sulfur atoms is from 0.01 to 0.7, and wherein said acid-curable resin is at least one compound selected from the group consisting of a phenol/aldehyde polycondensate, a urea/aldehyde polycondensate, and a co-condensate of said phenol/aldehyde and said urea/aldehyde polycondensates.

10. The binder/curing agent composition of claim 9, wherein said phosphorus-containing compound is at least one compound selected from the group consisting of phosphoric acid, condensed phosphoric acid, a phosphoric ester, and a phosphate.

11. The binder/curing agent composition of claim 9, wherein said weight ratio of sulfur atoms to the total weight of phosphorus atoms and sulfur atoms is from 0.03 to 0.6.

12. The binder/curing agent composition of claim 9, wherein said curing accelerator (b) is present in an amount of from 1.8 to 50.0% by weight based on the total weight of binder (a) and curing accelerator (b).

13. The binder/curing agent composition of claim 9, wherein said aldehyde is selected from the group consisting of formaldehyde, glyoxal and furfural.

14. The binder/curing agent composition of claim 9, wherein said phenol is selected from the group consisting of phenol, resorcinol, bisphenol A, bisphenol F, a compound represented by formula (2):

wherein R₁ represents a hydrocarbon group having from 1 to 10 carbon atoms, and a compound represented by formula (3):

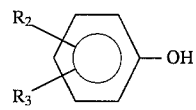

wherein R₂ and R₃ each independently represent a hydrocarbon group having from 1 to 10 carbon atoms.

15. The binder/curing agent composition of claim 9, wherein said binder/curing agent composition has a nitrogen content of from 0.1 to 6.0% by weight based on the total weight of binder (a) and curing accelerator (b).

16. The binder/curing agent composition of claim 9, wherein said acid-curable resin is a phenol/aldehyde polycondensate obtained by condensing an aldehyde with a phenolic monomer in a proportion of from 2 to 40% by weight, based on the combined weight of aldehyde and phenolic monomer.

17. The binder/curing agent composition of claim 13, wherein said binder/curing agent composition has a water content of from 0.5 to 30% by weight, based on the total weight of binder (a) and curing accelerator (b).

18. The binder/curing agent of claim 9, wherein said curing accelerator is 2,5-bishydroxymethylfuran.

19. A sand composition for mold making which comprises a granular refractory material, the binder composition of claim 1 and a curing agent for curing the binder composition.

20. The sand composition of claim 19, wherein said curing agent is a phosphorus-containing compound, a mixture of a phosphorus-containing compound and a sulfonic acid compound, a mixture of a phosphorus-containing compound and sulfuric acid, or a mixture of a phosphorus-containing compound, a sulfonic acid compound, and sulfuric acid.

21. The sand composition of claim 19, wherein said curing agent is selected from the group consisting of phosphoric acid, condensed phosphoric acid, a phosphoric ester, and a phosphate.

22. A sand composition for mold making which comprises a granular refractory material and the binder/curing agent composition of claim 9.

23. A process for making a mold which comprises:
charging a pattern with the sand composition of claim 19; and
allowing the binder contained in the sand composition to cure.

24. A process for making a mold which comprises:
charging a pattern with the sand composition of claim 22; and
allowing the binder contained in the sand composition to cure.

* * * * *